(12) United States Patent
Fujihara

(10) Patent No.: US 12,138,538 B2
(45) Date of Patent: Nov. 12, 2024

(54) INFORMATION PROCESSING APPARATUS AND GAME IMAGE DISTRIBUTING METHOD

(71) Applicant: Sony Interactive Entertainment Inc., Tokyo (JP)

(72) Inventor: Masahiro Fujihara, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 239 days.

(21) Appl. No.: 17/911,767

(22) PCT Filed: Mar. 19, 2021

(86) PCT No.: PCT/JP2021/011300
§ 371 (c)(1),
(2) Date: Sep. 15, 2022

(87) PCT Pub. No.: WO2021/193399
PCT Pub. Date: Sep. 30, 2021

(65) Prior Publication Data
US 2023/0138533 A1    May 4, 2023

(30) Foreign Application Priority Data
Mar. 26, 2020 (JP) .................. 2020-056770

(51) Int. Cl.
*A63F 13/53* (2014.01)
*A63F 13/213* (2014.01)
*A63F 13/87* (2014.01)

(52) U.S. Cl.
CPC ............ *A63F 13/53* (2014.09); *A63F 13/213* (2014.09); *A63F 13/87* (2014.09)

(58) Field of Classification Search
CPC ......... A63F 13/53; A63F 13/213; A63F 13/87
See application file for complete search history.

(56) References Cited

U.S. PATENT DOCUMENTS 5,558,339 A * 9/1996 Perlman .................. A63F 13/30
463/41
5,779,548 A * 7/1998 Asai ........................ A63F 13/45
463/31

(Continued)

FOREIGN PATENT DOCUMENTS

JP    2012038042 A    2/2012
JP    2017021775 A    1/2017

(Continued)

OTHER PUBLICATIONS

International Search Report for corresponding PCT Application No. PCT/JP2021/011300, 6 pages, dated May 18, 2021.

(Continued)

*Primary Examiner* — Steve Rowland
(74) *Attorney, Agent, or Firm* — Matthew B. Dernier, Esq.

(57) ABSTRACT

A message generation unit generates a notification message. A setting unit registers setting information determining whether or not a camera image is to be included in a distribution image. A distribution processing unit distributes a distribution image. When the camera image is set to be included in the distribution image, an image processing unit generates the distribution image including a region in which the notification message is superimposed. When the camera image is set not to be included in the distribution image, the image processing unit generates the distribution image not including the region in which the notification message is superimposed.

7 Claims, 15 Drawing Sheets

(56) References Cited

U.S. PATENT DOCUMENTS

| | | | |
|---|---|---|---|
| 11,040,279 B2 | 6/2021 | Nomura | |
| 11,338,211 B2 | 5/2022 | Fujihara | |
| 2002/0015040 A1* | 2/2002 | Takatsuka | G06T 15/20 345/427 |
| 2009/0125967 A1* | 5/2009 | Perlman | H04N 19/154 725/133 |
| 2010/0160040 A1* | 6/2010 | Ikeda | A63F 13/42 463/31 |
| 2010/0167816 A1* | 7/2010 | Perlman | H04N 19/436 463/43 |
| 2011/0281645 A1* | 11/2011 | Wolfson | A63F 13/86 463/31 |
| 2012/0100910 A1* | 4/2012 | Eichorn | H04N 21/43615 463/31 |
| 2014/0179439 A1* | 6/2014 | Miura | A63F 13/53 463/42 |
| 2015/0099586 A1* | 4/2015 | Huang | A63F 13/212 463/40 |
| 2015/0277706 A1* | 10/2015 | Chan | H04L 65/1089 715/719 |
| 2016/0093108 A1 | 3/2016 | Mao | |
| 2016/0158656 A1* | 6/2016 | Condrey | A63F 13/63 463/31 |
| 2016/0287997 A1* | 10/2016 | Laakkonen | A63F 13/00 |
| 2017/0109122 A1 | 4/2017 | Schmidt | |
| 2017/0157512 A1* | 6/2017 | Long | A63F 13/86 |
| 2017/0173476 A1 | 6/2017 | Schindler | |
| 2017/0249785 A1* | 8/2017 | Hooper | A63F 13/497 |
| 2017/0289633 A1 | 10/2017 | Tokunaga | |
| 2018/0093174 A1 | 4/2018 | Trombetta | |
| 2019/0118099 A1 | 4/2019 | Payzer | |
| 2019/0344172 A1 | 11/2019 | Nomura | |
| 2020/0143838 A1* | 5/2020 | Peleg | G06V 10/255 |
| 2020/0353368 A1* | 11/2020 | Fujihara | A63F 13/87 |
| 2021/0065881 A1* | 3/2021 | Sargent | G16H 30/40 |
| 2021/0136112 A1* | 5/2021 | Adams | G06F 21/1063 |
| 2021/0250650 A1 | 8/2021 | Kawakami | |
| 2021/0357512 A1* | 11/2021 | Busila | G06F 21/6254 |
| 2021/0397737 A1* | 12/2021 | De Berker | G06V 30/416 |
| 2022/0345498 A1* | 10/2022 | Adams | G06F 21/6254 |

FOREIGN PATENT DOCUMENTS

| | | |
|---|---|---|
| JP | 2018113514 A | 7/2018 |
| JP | 2019097889 A | 6/2019 |
| JP | 2020036251 A | 3/2020 |
| WO | 2015093506 A1 | 6/2015 |
| WO | 2017004433 A1 | 1/2017 |
| WO | 20190240811 A1 | 12/2019 |

OTHER PUBLICATIONS

Play Station Camera, URL: http://nyanto.net/2014/02/entry-551.html>, 11 pages, Feb. 28, 2014 (See Non-Pat. Lit. #1).
Notice of Reasons for Refusal for corresponding JP Application No. 2020-056770, 6 pages, dated May 30, 2023.
Extended European Search Report for corresponding EP Application No. 21776952.0, 10 pages, dated Jul. 17, 2024.

* cited by examiner

FIG. 8

BROADCAST GAME PLAY

☑ INCLUDE CAMERA VIDEO IMAGE IN BROADCAST
☑ INCLUDE MICROPHONE SOUND IN BROADCAST
☐ DISPLAY COMMENT ON SCREEN

CHANNEL NAME:

QUALITY: HIGH ▼

START BROADCASTING — 202

⊗ ENTER ◯ RETURN

| WHETHER OR NOT CAMERA IMAGE IS INCLUDED IN DISTRIBUTION IMAGE | IMAGE FORMING DISTRIBUTION IMAGE |
|---|---|
| INCLUDE | GAME IMAGE<br>SYSTEM IMAGE |
| NOT INCLUDE | GAME IMAGE |

130

144

| WHETHER OR NOT CAMERA IMAGE IS INCLUDED IN DISTRIBUTION IMAGE | IMAGE FORMING DISTRIBUTION IMAGE |
|---|---|
| INCLUDE | GAME IMAGE<br>FIRST SYSTEM IMAGE |
| NOT INCLUDE | GAME IMAGE |

130

INFORMATION PROCESSING APPARATUS AND GAME IMAGE DISTRIBUTING METHOD

TECHNICAL FIELD

The present invention relates to a technique of distributing a game image.

BACKGROUND ART

PTL 1 discloses an image sharing system in which a distribution image including a game image being played by a distribution user is distributed to viewing users through a shared server. During distribution of the game image, when a message containing personal information or privacy information is displayed in a pop-up window on the game image, causing a problem that the message displayed in the pop-up window is made to public to not only the distribution user, but also the viewing users.

To address this problem, the image sharing system disclosed in PTL 1 is provided with means of allowing the distribution user to set whether or not a notification message is to be included in a distribution image in a visually recognizable manner, for each type of notification message. PTL 1 discloses, as a technique of not causing the notification message to be included in the distribution image in a visually recognizable manner, a technique of masking the notification message displayed in the pop-up window on the game image with a black image in such a manner that the notification message is not allowed to be visually recognized.

CITATION LIST

Patent Literature

[PTL 1] JP 2019-97889A

SUMMARY

Technical Problem

To mask the notification message with a black image is a very significant useful scheme, in terms of easily covering contents of the message. However, the black image only hinders viewing of the distribution image for the viewing users, and consequently, frequent display of the black image is not preferable. In view of this, it is demanded that a display frequency of the black image be decreased.

In view of this, the present invention has an object to provide a technique for enhancing usability of an image sharing system of distributing a game image to a viewing user.

Solution to Problem

To solve the above-mentioned problem, an information processing apparatus according a mode of the present invention includes a game image generation unit configured to generate a game image, a message generation unit configured to generate a notification message, a setting unit configured to register setting information determining whether or not a camera image is to be included in a distribution image, an image processing unit configured to generate a distribution image including the game image, and a distribution processing unit configured to distribute the distribution image. When the camera image is set to be included in the distribution image, the image processing unit generates the distribution image including a region in which the notification message is superimposed, and when the camera image is set not to be included in the distribution image, the image processing unit generates the distribution image not including the region in which the notification message is superimposed.

An information processing apparatus according to another mode of the present invention includes a game image generation unit configured to generate a game image, a game frame buffer configured to store the game image generated by the game image generation unit, a system image generation unit configured to generate a system image, a system frame buffer configured to store the system image generated by the system image generation unit, and an image processing unit having a function of merging the game image stored in the game frame buffer and the system image stored in the system frame buffer. The system image generation unit generates a first system image and a second system image different from the first system image, and the system frame buffer includes a first frame buffer that stores the first system image and a second frame buffer that stores the second system image.

According to a further mode of the present invention, provided is a game image distributing method including a step of generating a game image, a step of generating a notification message, a step of setting whether or not a camera image is to be included in a distribution image, a step of generating a distribution image including the game image, and a step of distributing the distribution image. When the camera image is set to be included in the distribution image, the distribution image generating step generates the distribution image including a region in which the notification message is superimposed, and when the camera image is set not to be included in the distribution image, the distribution image generating step generates the distribution image not including the region in which the notification message is superimposed.

Note that any combinations of the above components and conversions of the expressions of the present invention between a method, an apparatus, a system, a recording medium, a computer program, and the like are also effective as modes of the present invention.

BRIEF DESCRIPTION OF DRAWINGS

FIG. 8 is a diagram depicting an example of a setting screen.

FIG. 9 is a diagram depicting an example of merge control information.

DESCRIPTION OF EMBODIMENT

Figure 1:
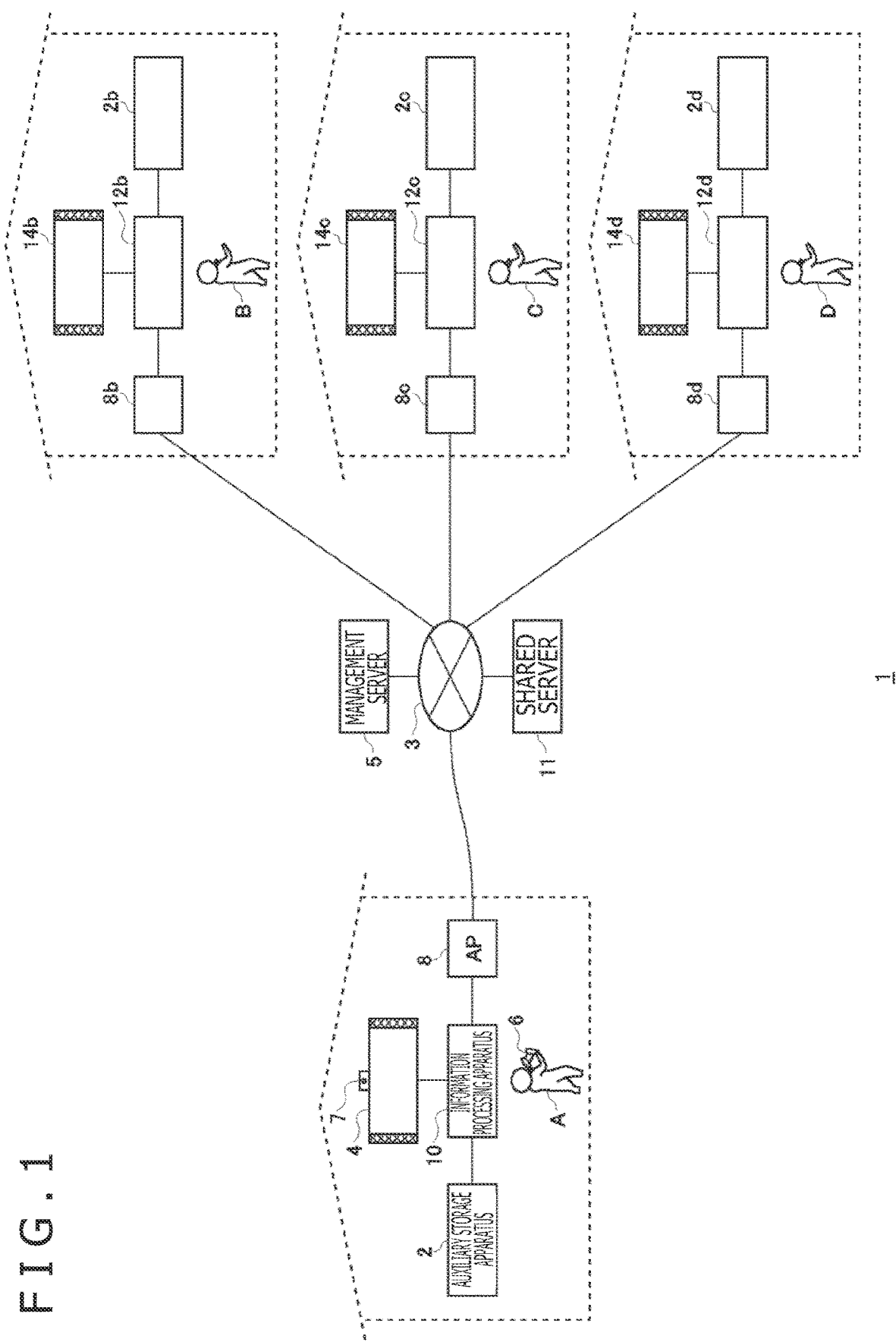
FIG. 1 is a diagram depicting an image sharing system according to an embodiment of the present invention.

FIG. 1 is a diagram depicting an image sharing system 1 according to an embodiment of the present invention. The image sharing system 1 realizes an environment in which a user A as a distributor performs live distribution of a game image and sound (a game image and a game sound) during play and other viewing users B, C, and D view the game image and sound. In this embodiment, streaming distribution of a game image is particularly described. However, it should be noted that a game sound is also streaming distributed along with the game image simultaneously. Note that the viewing users B, C, and D are merely examples and not limited to three. Also, the viewing users are not limited to users who have registered as a friend of the distribution user A and may be an unspecified user who can access a shared server 11.

The image sharing system 1 includes an information processing apparatus 10 operated by the distribution user A, information processing terminals 12b, 12c, and 12d operated by the respective viewing users B, C, and D (hereinafter referred to as an "information processing terminal 12" when not particularly distinguished from each other), a management server 5, and the shared server 11, and they are connected to one another through a network 3 such as the Internet. Note that, since a configuration of the information processing terminal 12 of each of the viewing users is the same as a configuration of the information processing apparatus 10 of the distribution user A in the embodiment. The configuration of the periphery of the information processing apparatus 10 of the distribution user A will be described below as a representative.

An access point (hereinafter referred to as an "AP") 8 has functions of a wireless access point and a router, and the information processing apparatus 10 connects to the AP 8 in a wireless or a wired manner to communicatably connect to the management server 5, the shared server 11, and the information processing terminal 12 on the network 3.

An input apparatus 6 which is operated by a user establishes connection to the information processing apparatus 10 in a wireless or a wired manner, and the input apparatus 6 outputs operation information by the user to the information processing apparatus 10. When receiving operation information from the input apparatus 6, the information processing apparatus 10 reflects the operation information on processing of system software or application software, and causes an output apparatus 4 to output a result of the processing. In the embodiment, the information processing apparatus 10 may be a game apparatus which executes a game program, and the input apparatus 6 may be a game controller. The input apparatus 6 includes a plurality of input sections such as a plurality of push-type operation buttons, an analog stick capable of inputting an analog quantity, and a rotary button.

The auxiliary storage apparatus 2 is a storage such as a hard disk drive (HDD) or a solid state drive (SSD) and may be a built-in type storage apparatus, or may be an external storage apparatus connected to the information processing apparatus 10 by a universal serial bus (USB). The output apparatus 4 may be a television set having a display which outputs an image and a loudspeaker which outputs sound. The output apparatus 4 may be a head-mounted display. A camera 7 captures a space in which the user is present.

The information processing apparatus 10 performs streaming distribution of a game image during play to the shared server 11 to broadcast the game image to the information processing terminal 12 which accesses the shared server 11. Thus, the image sharing system 1 in the embodiment works as a game image distribution system. Note that the information processing terminal 12 may be a stationary game console same as the information processing apparatus 10 or may be a portable terminal apparatus such as a smartphone or a tablet.

The management server 5 provides a network service to the user of the information processing apparatus 10 and to the user of the information processing terminal 12. The management server 5 manages network accounts for identifying the users, and each user uses own network account to sign in to the network service. By signing in to the network service, the user can register save data of a game or a virtual award article (trophy) acquired during a game play into the management server 5. In addition, the user can perform streaming distribution of a game image and sound to the shared server 11. Also, the user accesses the shared server 11 and can view a game image and sound through the shared server 11.

In the embodiment, the user A plays a game by operating the input apparatus 6, and a game image during play (hereinafter also referred to as a "play image") is displayed on the output apparatus 4. At this time, the play image is also distributed to the information processing terminals 12b, 12c, and 12d of the respective viewing users through the shared server 11 from the information processing apparatus 10, so that the play image is displayed on each of output apparatuses 14b, 14c, and 14d (hereinafter referred to as an "output apparatus 14" when not particularly distinguished from each other). Note that a resolution of the play image to be distributed may be set lower than a resolution of a play image to be displayed on the output apparatus 4.

Figure 2:
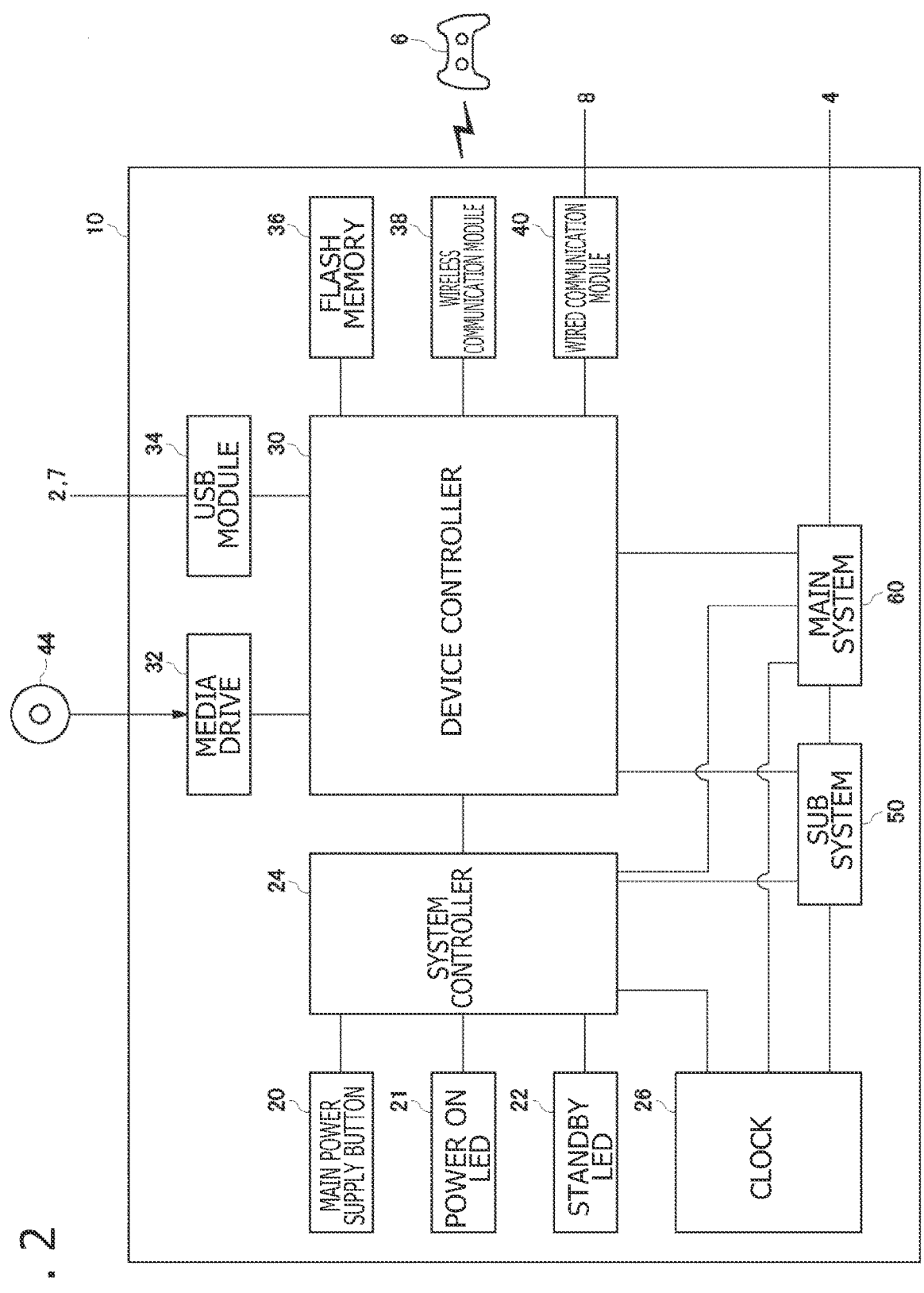
FIG. 2 is a diagram depicting a hardware configuration of an information processing apparatus.

FIG. 2 is a diagram depicting functional blocks of the information processing apparatus 10. The information processing apparatus 10 includes a main power supply button 20, a power ON light emitting diode (LED) 21, a standby LED 22, a system controller 24, a clock 26, a device controller 30, a media drive 32, a USB module 34, a flash memory 36, a wireless communication module 38, a wired communication module 40, a sub system 50, and a main system 60.

The main system 60 includes a main central processing unit (CPU), a memory as a main storage apparatus, a memory controller, a graphics processing unit (GPU), and the like. The GPU is mainly used in arithmetic processing for a game program. These functions may be configured as a system-on-chip and formed on one chip. The main CPU has a function of executing a game program recorded in the auxiliary storage apparatus 2 or a read-only memory (ROM) medium 44.

The sub system 50 includes a sub-CPU, a memory as a main storage apparatus, a memory controller, and the like. The sub system 50 does not include a GPU. Further, the sub system 50 does not have a function of executing a game program. The number of circuit gates of the sub CPU is smaller than the number of circuit gates of the main CPU, and the operation power consumption of the sub CPU is lower than that of the main CPU. The sub CPU operates while the main CPU is in a standby state, and the processing functions of the sub CPU are limited in order to suppress the power consumption of the sub CPU low.

The main power supply button 20 is an input unit to which an operation input from the user is carried out and is provided on a front face of a housing of the information processing apparatus 10 to be operated in order to turn on or off the power supply to the main system 60 of the information processing apparatus 10. The power ON LED 21 is lit when the main power supply button 20 is turned on, and the standby LED 22 is lit when the main power supply button 20 is turned off.

The system controller 24 detects depression of the main power supply button 20 by the user. When the main power supply button 20 is depressed while the main power supply is in an off state, then the system controller 24 acquires the depression operation as an "on instruction." Conversely, the main power supply button 20 is depressed while the main power supply is in an on state, the system controller 24 then acquires the depression operation as an "off instruction."

The clock 26 is a real time clock, and generates date and time information at present and supplies the generated information to the system controller 24, the sub system 50, and the main system 60. The device controller 30 is configured as a large-scale integrated circuit (LSI) which executes delivery of information between devices like a south bridge. As depicted in FIG. 2, such devices as the system controller 24, the media drive 32, the USB module 34, the flash memory 36, the wireless communication module 38, the wired communication module 40, the sub system 50, and the main system 60 are connected to the device controller 30. The device controller 30 absorbs a difference in electric characteristic and a difference in data transfer rate between the devices and controls a timing of data transfer.

The media drive 32 is a drive apparatus which loads the ROM medium 44 on which application software of a game or the like and license information are recorded and drives the ROM medium 44 to read out a program, data, and the like from the ROM medium 44. The ROM medium 44 may be a read-only recording medium such as an optical disc, a magneto-optical disc, or a Blu-ray disc.

The USB module 34 is a module to be connected to an external device by a USB cable. The USB module 34 may be connected to the auxiliary storage apparatus 2 and the camera 7 by a USB cable. The flash memory 36 is an auxiliary storage apparatus which configures an internal storage. The wireless communication module 38 wirelessly communicates, for example, with the input apparatus 6 by use of a communication protocol such as a Bluetooth (registered trademark) protocol or Institute of Electrical and Electronics Engineers (IEEE) 802.11 protocol. The wired communication module 40 communicates with an external device in a wired manner and is connected to the outside network through the AP 8.

Figure 3:
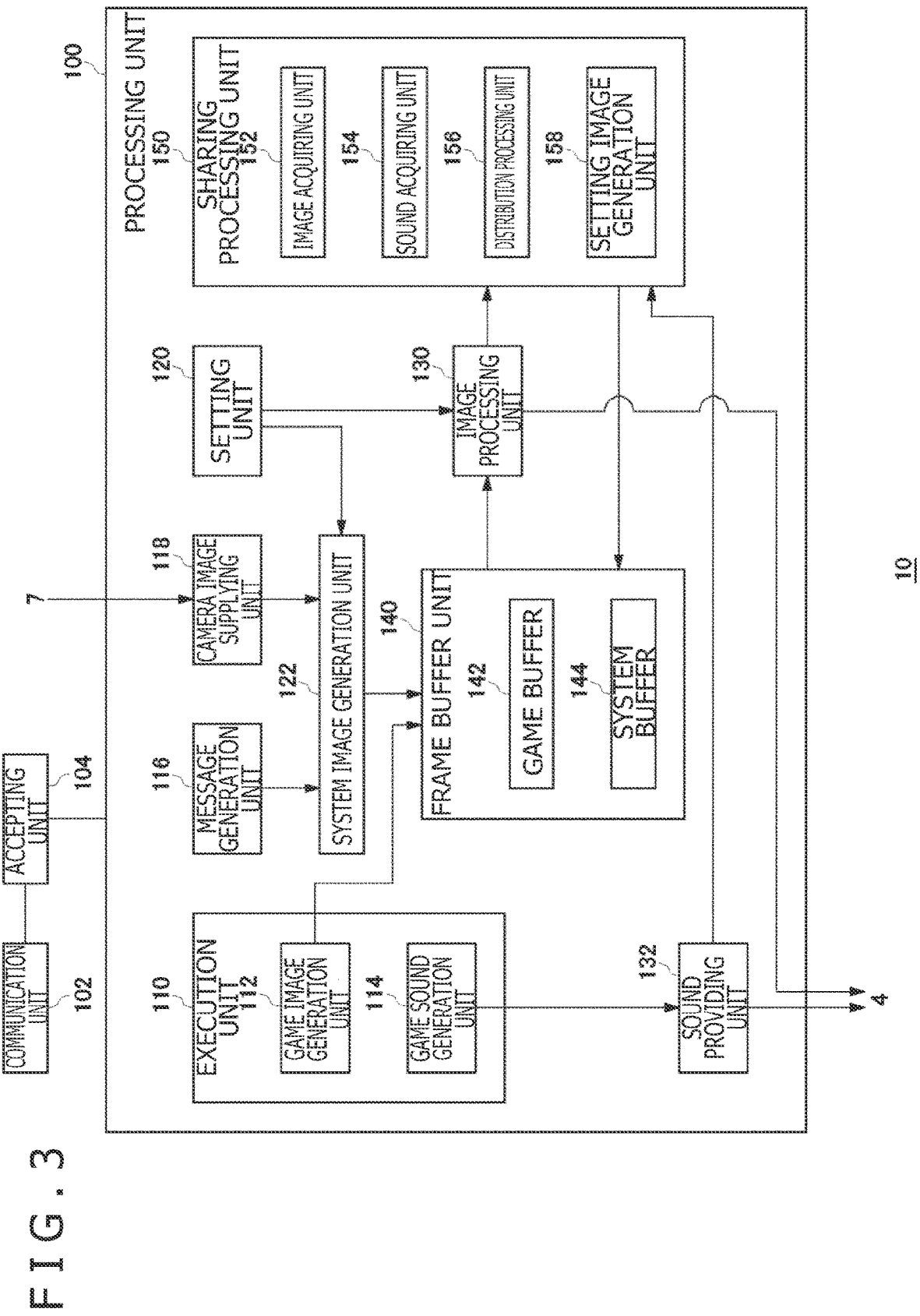
FIG. 3 is a diagram depicting functional blocks of the information processing apparatus.

FIG. 3 depicts functional blocks of the information processing apparatus 10 which operates as a distribution apparatus for streaming data. The information processing apparatus 10 includes a processing unit 100, a communication unit 102, and an accepting unit 104. The processing unit 100 includes an execution unit 110, a message generation unit 116, a camera image supplying unit 118, a setting unit 120, a system image generation unit 122, an image processing unit 130, a sound providing unit 132, a frame buffer unit 140, and a sharing processing unit 150.

The execution unit 110 includes a game image generation unit 112 and a game sound generation unit 114. The frame buffer unit 140 includes a plurality of frame buffers, such as a game buffer 142 and a system buffer 144. In the embodiment, the game buffer 142 includes a plurality of frame buffers, and the system buffer 144 includes one frame buffer. Note that, as described later, the system buffer 144 may include a plurality of frame buffers in the modification example. The sharing processing unit 150 includes an image acquiring unit 152, a sound acquiring unit 154, a distribution processing unit 156, and a setting image generation unit 158.

In FIG. 3, elements indicated as functional blocks for performing various processing operations can be configured by hardware such as a circuit block, a memory, or another LSI or implemented by software such as system software or a game program loaded into the memory. Thus, it will be understood by those skilled in the art that these functional blocks may variously be implemented by hardware only, by software only, or by a combination of hardware and software. The functional blocks are not limited to any of these.

The communication unit 102 receives operation information obtained as a result of operation of the user on the input section of the input apparatus 6 and transmits the image and sound data generated in the processing unit 100 to the shared server 11. It is assumed that the communication unit 102 has the functional blocks of the wireless communication module 38 and wired communication module 40 depicted in FIG. 2.

The accepting unit 104 is disposed between the communication unit 102 and the processing unit 100 and transmits data or information to and from the communication unit 102 and the processing unit 100. When accepting operation information of the input apparatus 6 through the communication unit 102, the accepting unit 104 supplies the accepted operation information to predetermined functional blocks of the processing unit 100.

The execution unit 110 executes a game program (hereinafter referred to simply as a "game" in some cases). The functional block provided as the execution unit 110 is realized by the system software, the game software, the hardware such as the GPU, or the like. When receiving a result of the execution of the game program, the game image generation unit 112 generates image data of the game, and the game sound generation unit 114 generates sound data of the game. Note that the game is merely an example of an application, and the execution unit 110 may execute an application other than a game.

While the user A is playing a game, the execution unit 110 executes a game program and executes arithmetic processing to move a game character in a virtual space on the basis of the operation information that the user A inputs with the input apparatus 6. The game image generation unit 112 includes a GPU which executes rendering processing or the like, and receives a result of the arithmetic processing in the virtual space to generate game image data from a viewpoint position (virtual camera) in the virtual space. Moreover, the game sound generation unit 114 generates game sound data in the virtual space.

Figure 4:
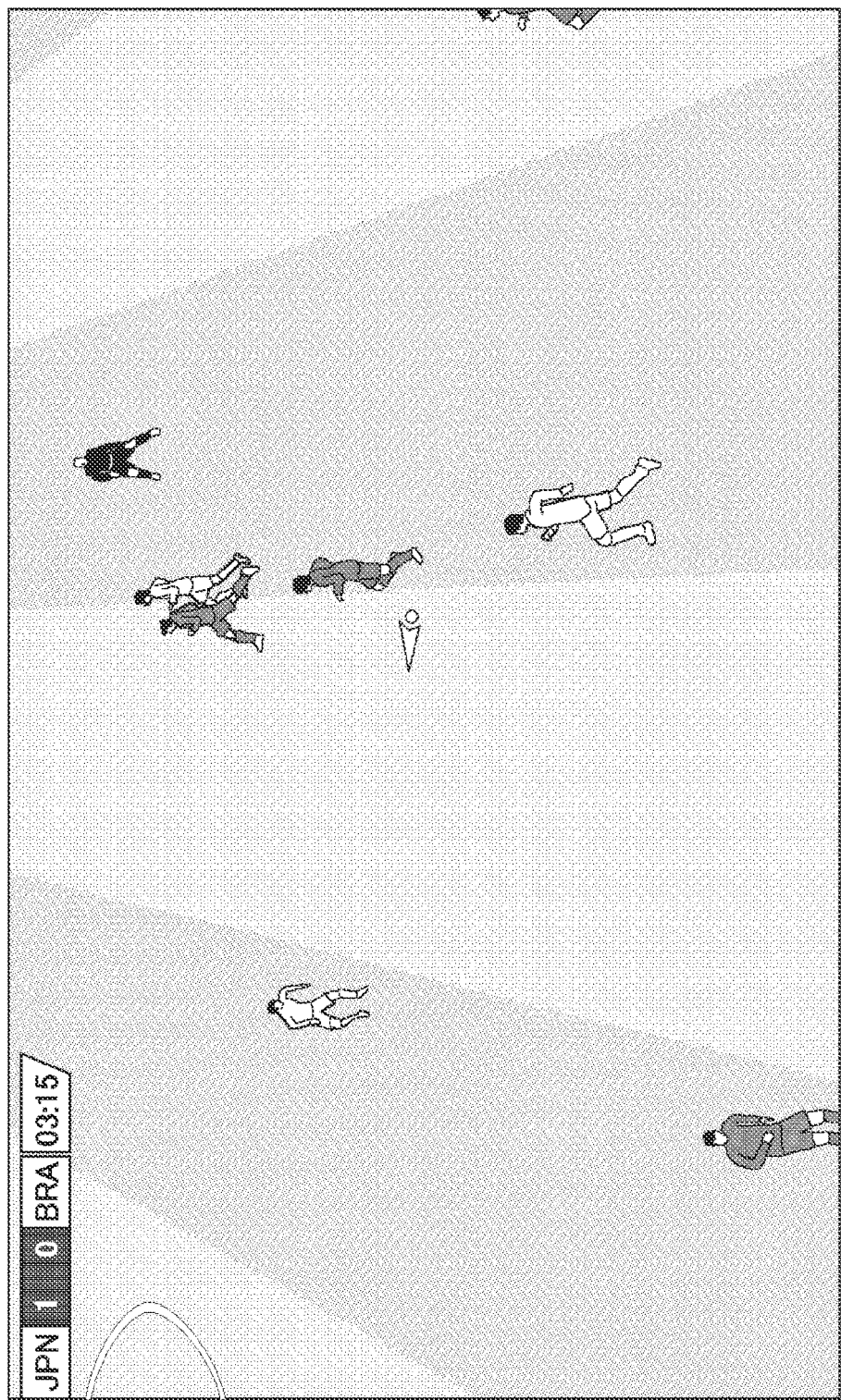
FIG. 4 is a diagram depicting an example of a game screen.

FIG. 4 is a diagram depicting an example of a game screen displayed on the output apparatus 4 of the user A. This game screen is the game screen prior to streaming distribution. During a game play of the user A, the game image generation unit 112 generates a game image and stores the generated game image in the game buffer 142. In addition, the game sound generation unit 114 generates a game sound and supplies the generated game sound to the sound providing unit 132.

The game buffer 142 in the embodiment includes a plurality of frame buffers, and the game image generation unit 112 can generate a plurality of game images as many as the frame buffers as the upper limit. For example, in a case in which the game buffer 142 has three frame buffers, the game image generation unit 112 generates one main image including a background image and a character image, and two sub images including supplemental information for game progress, and stores each image in each corresponding one of the frame buffers. For example, the sub image may be a map image indicating a position of an opponent team in a competitive game or may be a list image of information on weapons the player can use. The image processing unit 130 merges three game images which are stored in the three frame buffers to generate a display image. Note that the game image generation unit 112 does not need to generate three game images. For example, the game image generation unit 112 is only required to generate one main image and use one frame buffer and may not use the two other frame buffers.

The image processing unit 130 provides the display image to the output apparatus 4, and the sound providing unit 132 provides the game sound to the output apparatus 4. The output apparatus 4 outputs the game image and the game sound, and the user A plays the game while viewing the game image and sound output from the output apparatus 4.

Figure 5:
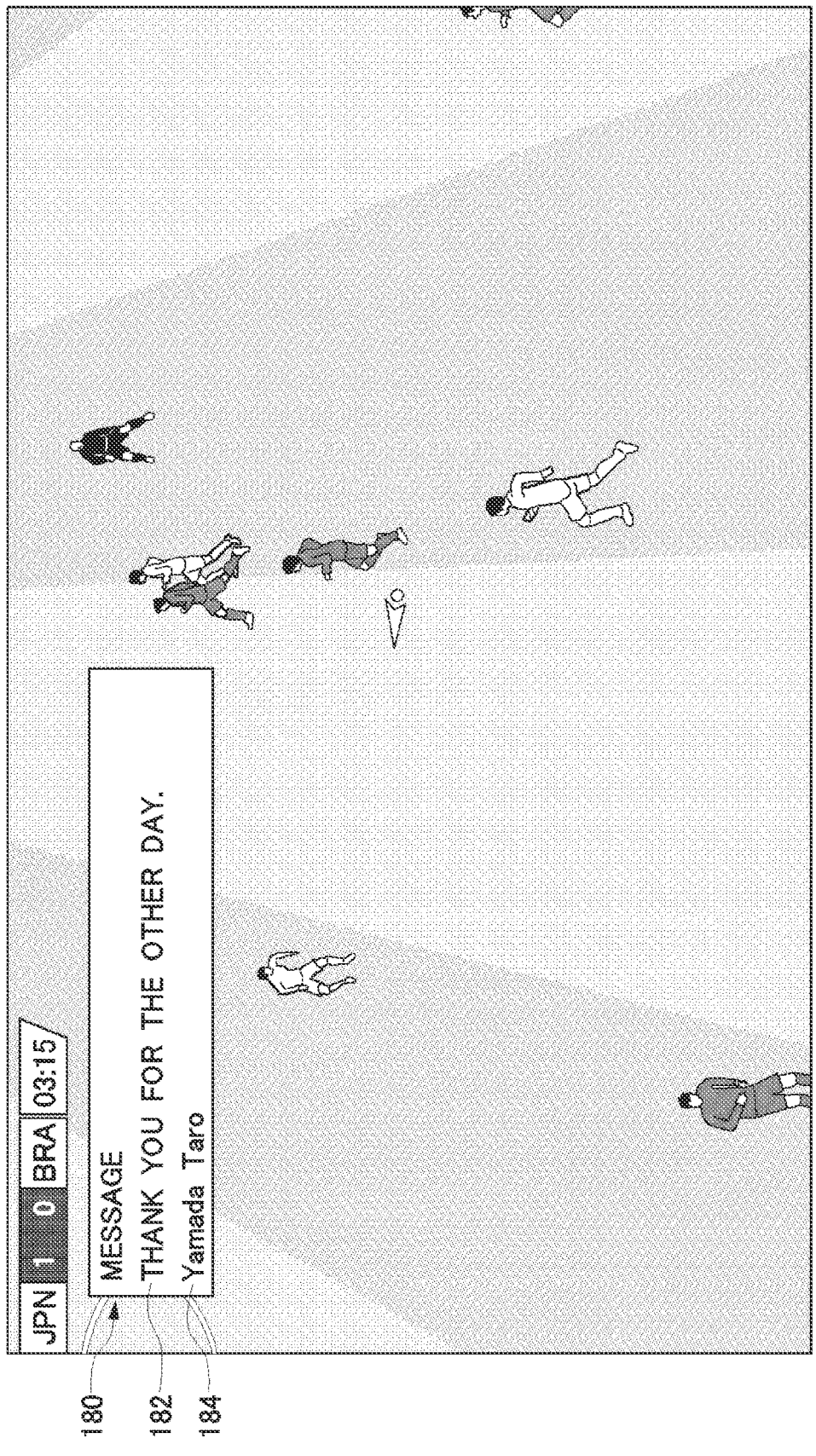
FIG. 5 is a diagram depicting an example of a pop-up window.

FIG. 5 is a diagram depicting an example of a pop-up window which is displayed in a superimposed manner on the game screen. In the image sharing system 1, the management server 5 registers friends of the user A. For example, when a friend is in an online state or a friend creates a message to the user A, the management server 5 transmits a state information regarding the friend or the message from the friend to the information processing apparatus 10 of the user A. When the accepting unit 104 accepts the state information regarding the friend or the message from the friend, the message generation unit 116 generates a notification message for the user A and then provides the generated notification message for the user A to the system image generation unit 122.

In addition, the message generation unit 116 may generate a notification message according to an event which is generated during the game play. For example, when the user A earns a trophy during the game play, the game program notifies the message generation unit 116 of earned trophy information. Upon reception of this notification, the message generation unit 116 generates a notification message regarding the trophy earned, to provide the generated notification message to the system image generation unit 122.

In this manner, during the game play, the message generation unit 116 generates a notification message for various reasons. The system image generation unit 122 generates a system image including the notification message and stores the generated system image in the system buffer 144. The system image generation unit 122 is included in system software, and a system image in this embodiment means an image generated by the system software.

Figure 6:
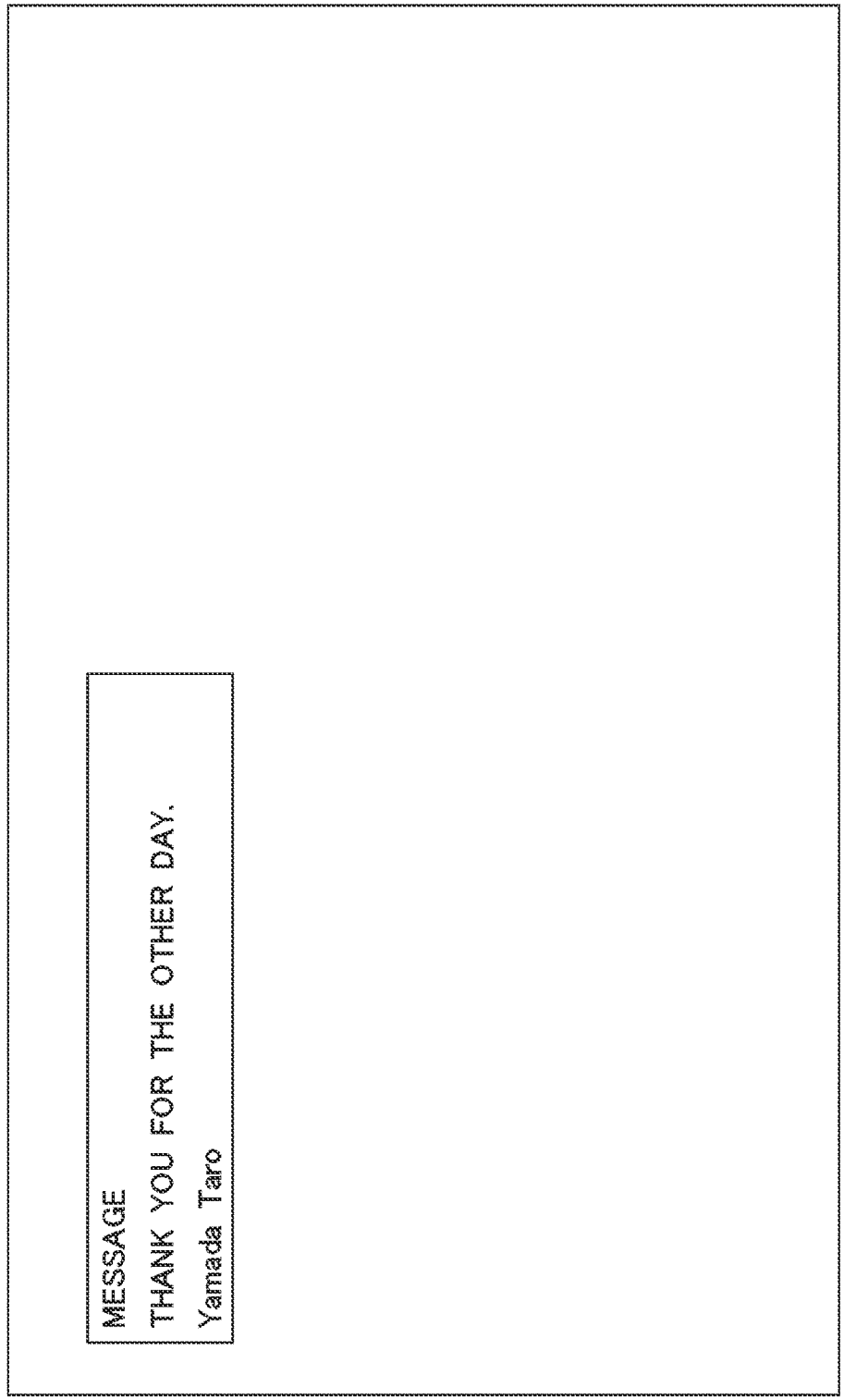
FIG. 6 is a diagram depicting a system image that is stored in a system buffer.

FIG. 6 depicts a system image that is stored in the system buffer. The system image generation unit 122 generates one system image to be merged into a game image and stores the generated system image in the system buffer 144. The image processing unit 130 merges the game image which is read out from the game buffer 142 and the system image which is read out from the system buffer 144, to generate a display image (see FIG. 5). The image processing unit 130 in this embodiment carries out a merging process of the game image and the system image by superimposing the system image on the game image. In this manner, when the notification message is generated during the game play, the generated notification message is displayed in a form of the pop-up window 180 on the upper left corner on the display screen for a fixed period of time.

A user name 184 identifying a friend who has sent the message and a text of the message 182 indicating at least part (first one sentence) of the sent message are included in the pop-up window 180 depicted in FIG. 5. In a case where the management server 5 requests a real name registration as the user name, the real name of the friend is contained in the pop-up window 180. The game screen depicted in FIG. 5 is the one before streaming distribution is carried out, and the display of the real name "Yamada Taro" is to be viewed only by the user A. Accordingly, there is no problem of disclosure of the personal information at this point of time. However, while streaming distribution is carried out, the personal information may be made to public to unspecified viewing users, which may be problematic in terms of disclosure of the personal information.

Hereinafter, the sharing process in the embodiment will be described.

The sharing processing unit 150 performs a process for sharing image and sound data of the game being played by the user A with another user through the shared server 11. Users who access the shared server 11 are not limited to the friends of the user A but may include unspecified users who use the service of the shared server 11. The sharing process of the game image and sound data is started at a time when the user A operates a specified input button (SHARE button) provided in the input apparatus 6 as a trigger, and the setting image generation unit 158 generates an input image indicating options regarding sharing of the image and sound data.

Figure 7:
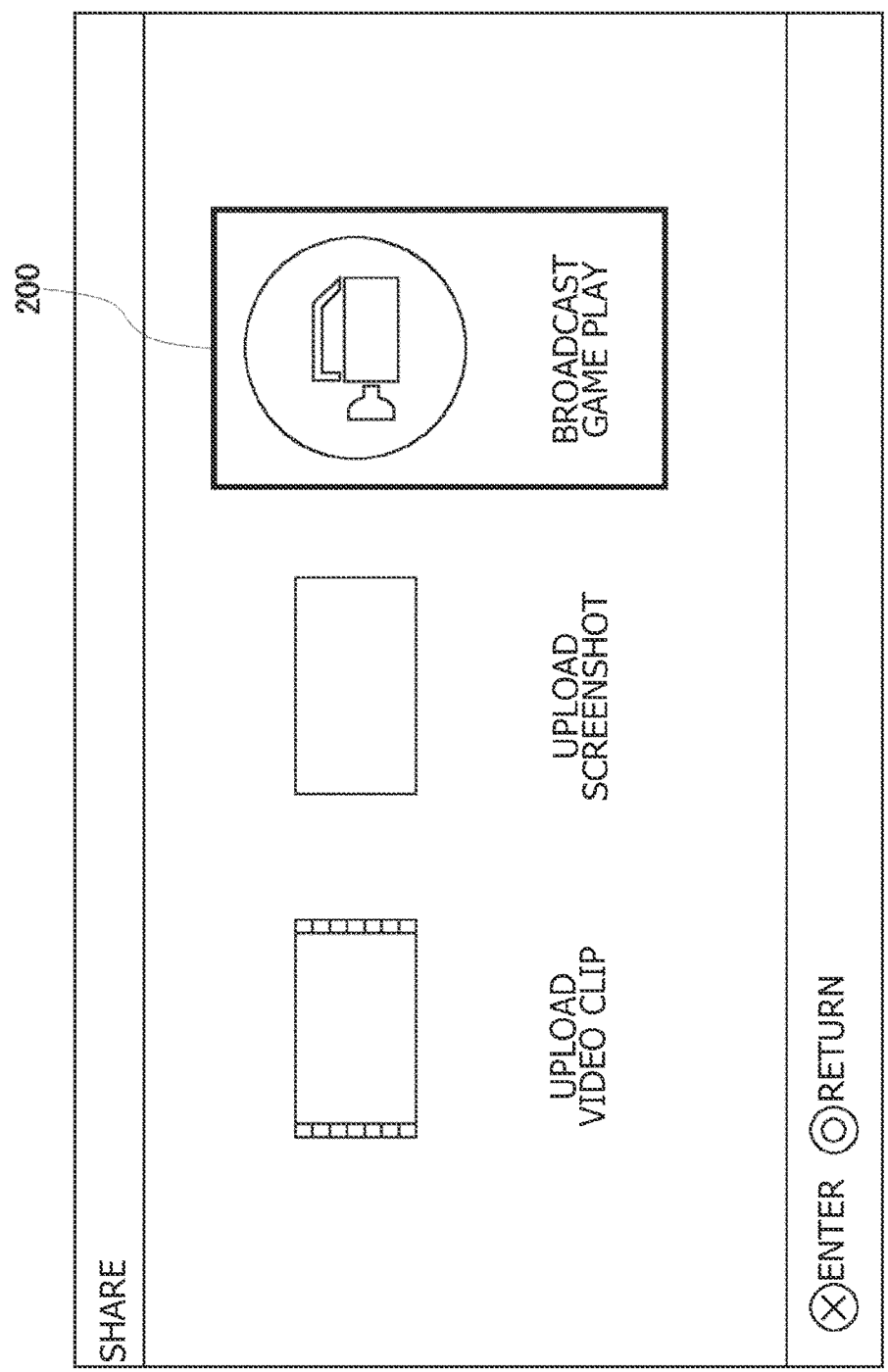
FIG. 7 is a diagram depicting an example of an input screen indicating options of a sharing process.

FIG. 7 depicts an example of an input screen indicating the options in the sharing process. The setting image generation unit 158 generates an input image indicating the options in the sharing process and stores the generated input image in the system buffer 144. The image processing unit 130 reads out the input image from the system buffer 144 to display the read input image on the output apparatus 4.

On this input screen, three options regarding the sharing of the image and sound data are indicated. The option "UPLOAD VIDEO CLIP" is a graphical user interface (GUI) element for designating that an image recorded in the auxiliary storage apparatus 2 is to be uploaded to the shared server 11. The option "UPLOAD SCREENSHOT" is a GUI element for designating that an image of a screen shot is to be uploaded to the shared server 11. The option "BROADCAST GAME PLAY" is a GUI element for designating that the image and sound data of the game is to be relayed in real time through the shared server 11. The user A operates the input apparatus 6 to move a selection frame 200, and then selects any one of the GUI elements and presses ENTER button, thereby executing the sharing process selected.

In this embodiment, the GUI element "BROADCASTS GAME PLAY" is assumed to be selected. Note that, after this GUI element is selected, the setting image generation unit 158 displays a setting screen for selecting setting information in broadcast distribution on the output apparatus 4.

FIG. 8 depicts an example of the setting screen to be displayed in a case in which "BROADCASTS GAME PLAY" is selected. This setting screen includes the following items for setting a distribution mode of the broadcast.

(a) Item for Selecting Whether or not Camera Image is Included in Distribution Image With respect to the item (a), a check box "INCLUDE CAMERA VIDEO IMAGE IN BROADCAST" may be in a selected state by default. When the user A does not want to distribute a camera image (an image captured by the camera), the user A cancels the selection of the check box. Note that, in a case in which the option "INCLUDE CAMERA VIDEO IMAGE IN BROADCAST" is selected, another option for setting a display position of the camera image may be provided, and the user A may be allowed to designate the display position of the camera image.

(b) Item for Selecting Whether or not Microphone Sound is Distributed

With respect to the item (b), a check box "INCLUDE MICROPHONE SOUND IN BROADCAST" may be in a selected state by default. When the user A does not want to distribute a microphone sound, the user A cancels the selection of the check box.

(c) Item for Selecting Whether or not Comment from Viewing User is Displayed on Display Screen With respect to the item (c), a check box "DISPLAY COMMENT ON SCREEN" may be in a selected state by default. When the user A does not want display of any comment, the user A cancels the selection of the check box.

(d) Item for Selecting Image Quality of Distribution Image

With respect to the item (d), the user A can select a resolution equal to or lower than a resolution of the game image to be displayed on the output apparatus 4. As a resolution of the distribution image, the resolution lower than the resolution of the game image displayed on the output apparatus 4 may be set by default.

Moreover, in the setting screen, the user A may be able to set whether or not the notification message is included in the distribution image so as to be visually recognizable, for a type of contents of each notification message. As described above, the setting unit 120 sets contents selected by the user A in the items (a), (b), (c), and (d), regarding streaming distribution. Specifically, when the user A arranges a frame 202 on "START BROADCAST" and pushes ENTER button of the input apparatus 6, the setting unit 120 registers the contents selected by the user A in the items (a), (b), (c), and (d) in the auxiliary storage apparatus 2, as the setting information of the streaming distribution information, supplying the setting information to the system image generation unit 122 and the image processing unit 130.

In this embodiment, the image processing unit 130 refers to merge control information in association with information indicating whether or not the camera image is distributed and information identifying an image forming a distribution image, to carry out a merging process of an image to be distributed.

FIG. 9 indicates an example of merge control information. The merge control information is information for controlling merging of images stored in the frame buffer unit 140, and is stored in the flash memory 36 or a storing unit such as the auxiliary storage apparatus 2. The image control information indicated in FIG. 9 determines the followings.

In a case in which the camera image is included in the distribution image, the distribution image is generated by merging a game image and a system image.

In a case in which the camera image is not included in the distribution image, the distribution image is generated by use of the game image only and does not include the system image.

Before starting streaming distribution, the setting unit 120 provides the setting information regarding the streaming distribution to the image processing unit 130. During the streaming distribution, the image processing unit 130 generates a display image on the basis of the contents of the item (a) included in the setting information and the merge control information.

In the following, given is a description of a display image generation process in a case in which "INCLUDE CAMERA VIDEO IMAGE IN BROADCAST" is set in the item (a) in the setting information.

Figure 10:
FIG. 10 is a diagram depicting an example of a system image.

FIG. 10 depicts an example of a system image generated by the system image generation unit 122. During streaming distribution, the camera image supplying unit 118 supplies the camera image captured by the camera 7 to the system image generation unit 122, and the system image generation unit 122 generates a system image including the camera image. The generated system image is stored in the system buffer 144.

Figure 11:
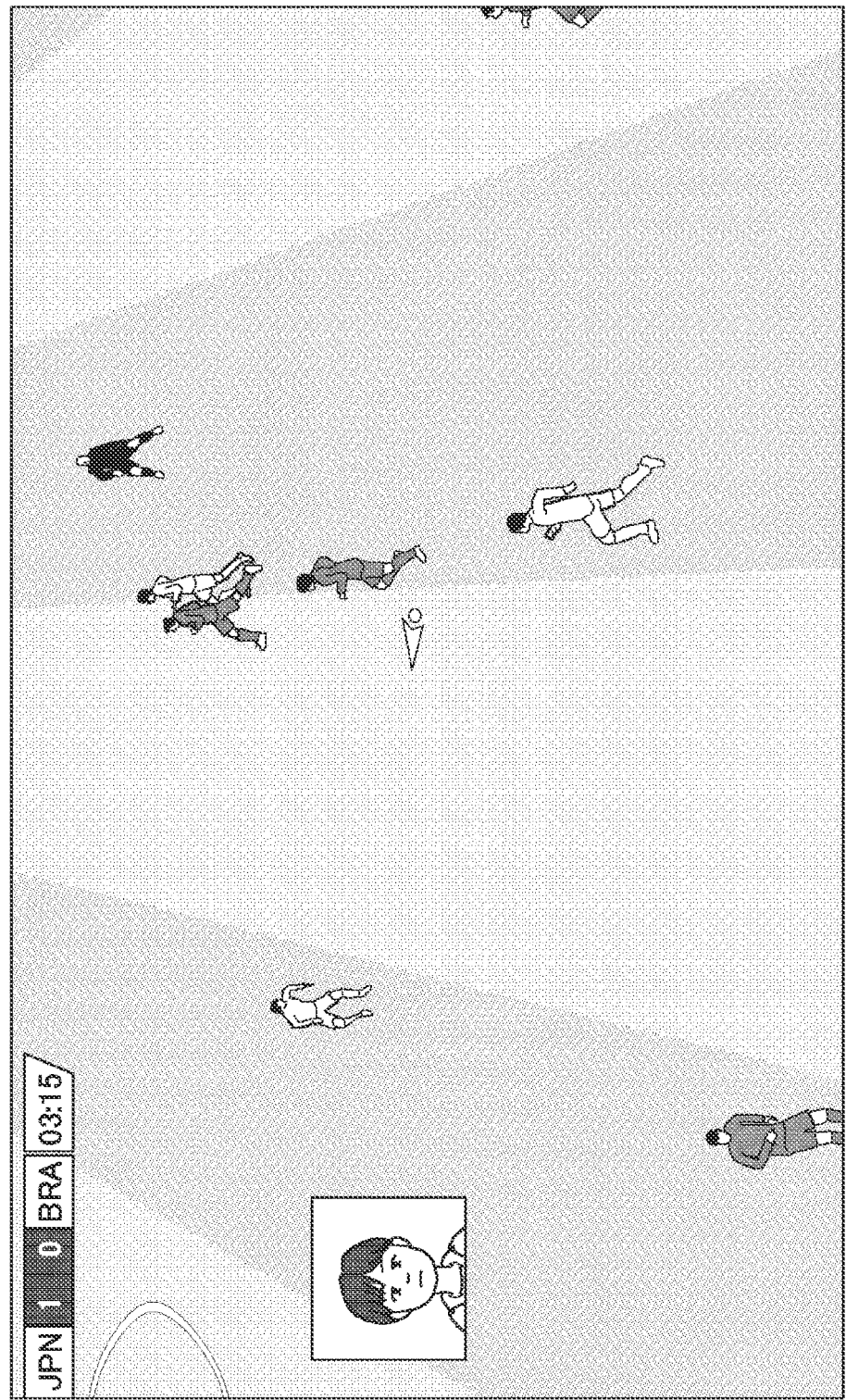
FIG. 11 is a diagram depicting an example of a screen to be displayed on an output apparatus.

FIG. 11 depicts an example of a screen displayed on the output apparatuses of the user A and the viewing users during streaming distribution. The image processing unit 130 refers to the setting information regarding the streaming distribution and the merge control information and then decides the image to be merged. In this example, it is set such that the camera image is included in the distribution image, and hence, the image processing unit 130 merges the game image read out from the game buffer 142 and the system image read out from the system buffer 144 to generate a display image.

During the streaming distribution, the image processing unit 130 generates a display image including the game image to output to the output apparatus 4 and the sharing processing unit 150. The sound providing unit 132 outputs the game sound generated in the game sound generation unit 114 to the output apparatus 4 and also superimposes the sound that is input to the microphone of the information processing apparatus 10 onto the game sound, thereby outputting the sound to the sharing processing unit 150.

The image acquiring unit 152 acquires the image provided by the image processing unit 130, and the sound acquiring unit 154 acquires the sound provided by the sound providing unit 132. The image acquired by the image acquiring unit 152 and the sound acquired by the sound acquiring unit 154 are a distribution image and a distribution sound that are to be distributed to the shared server 11, respectively. The distribution processing unit 156 adjusts the quality of each of the distribution image and the distribution sound thus acquired as needed, encodes them, and distributes the encoded image data and sound data to one or more of the information processing terminals 12 through the shared server 11 by streaming. Thus, in the image sharing system 1, the game image and the game sound viewed by the user A who plays the game are distributed by streaming as they are, while the quality of each of the game image and the game sound has some change. Accordingly, the viewing users can access the shared server 11 from the information processing terminals 12 to view the same game image and the same game sound as the user A.

Hereinafter, a case in which the message generation unit 116 generates a notification message will be described. As has been described above, the message generation unit 116 generates a notification message for various reasons during the game play of the user A. When the message generation unit 116 generates a notification message, the system image generation unit 122 generates a system image including the notification message.

Figure 12:
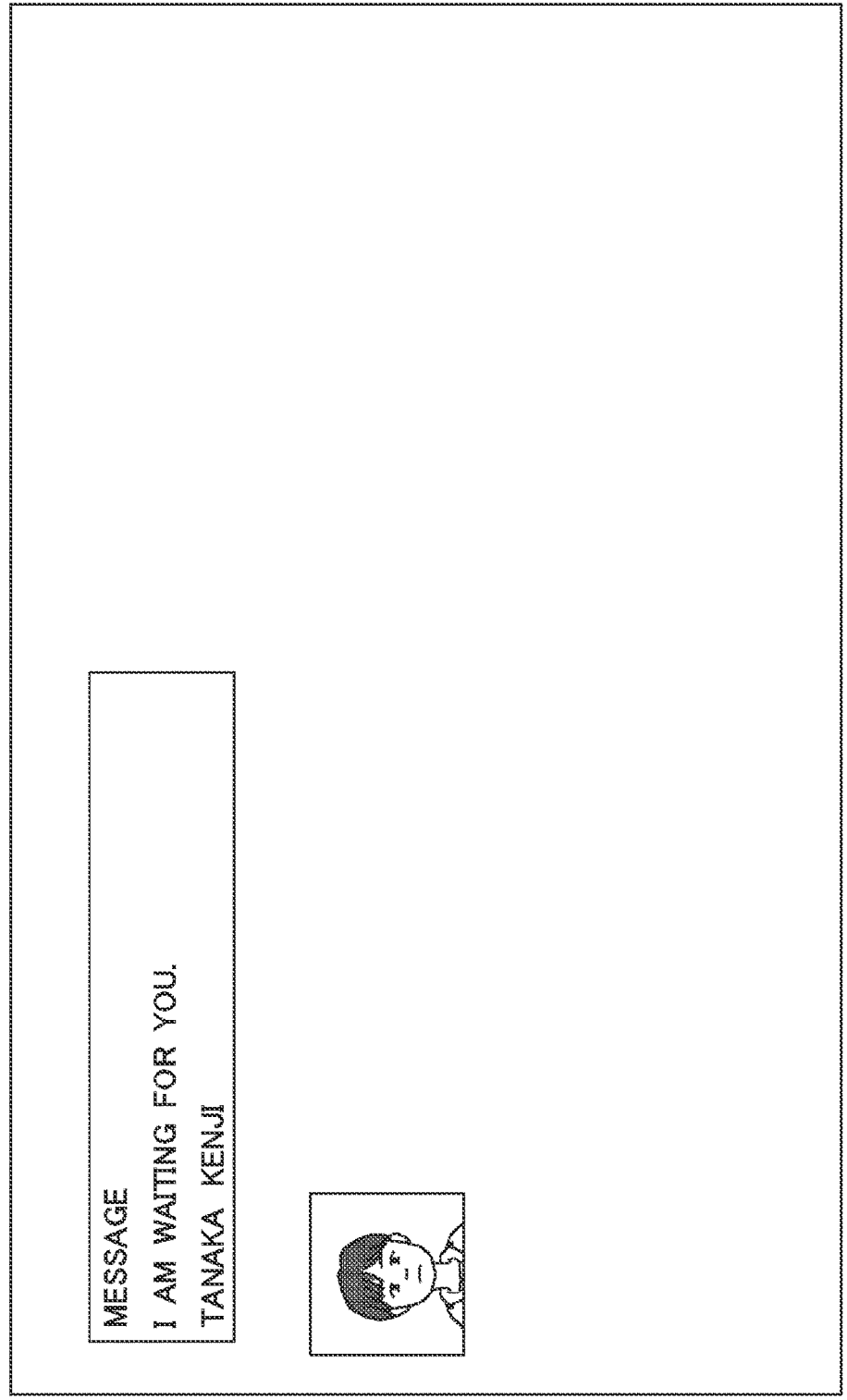
FIG. 12 is a diagram depicting an example of a system image.

FIG. 12 depicts an example of the system image generated by the system image generation unit 122. When the message generation unit 116 generates a notification message, the system image generation unit 122 generates a system image including the notification message along with the camera image. The system image thus generated is stored in the system buffer 144. Note that the notification message is to be displayed only for a predetermined period of time, so that the system image generation unit 122 includes the notification message in the system image for the predetermined period of time.

Figure 13:
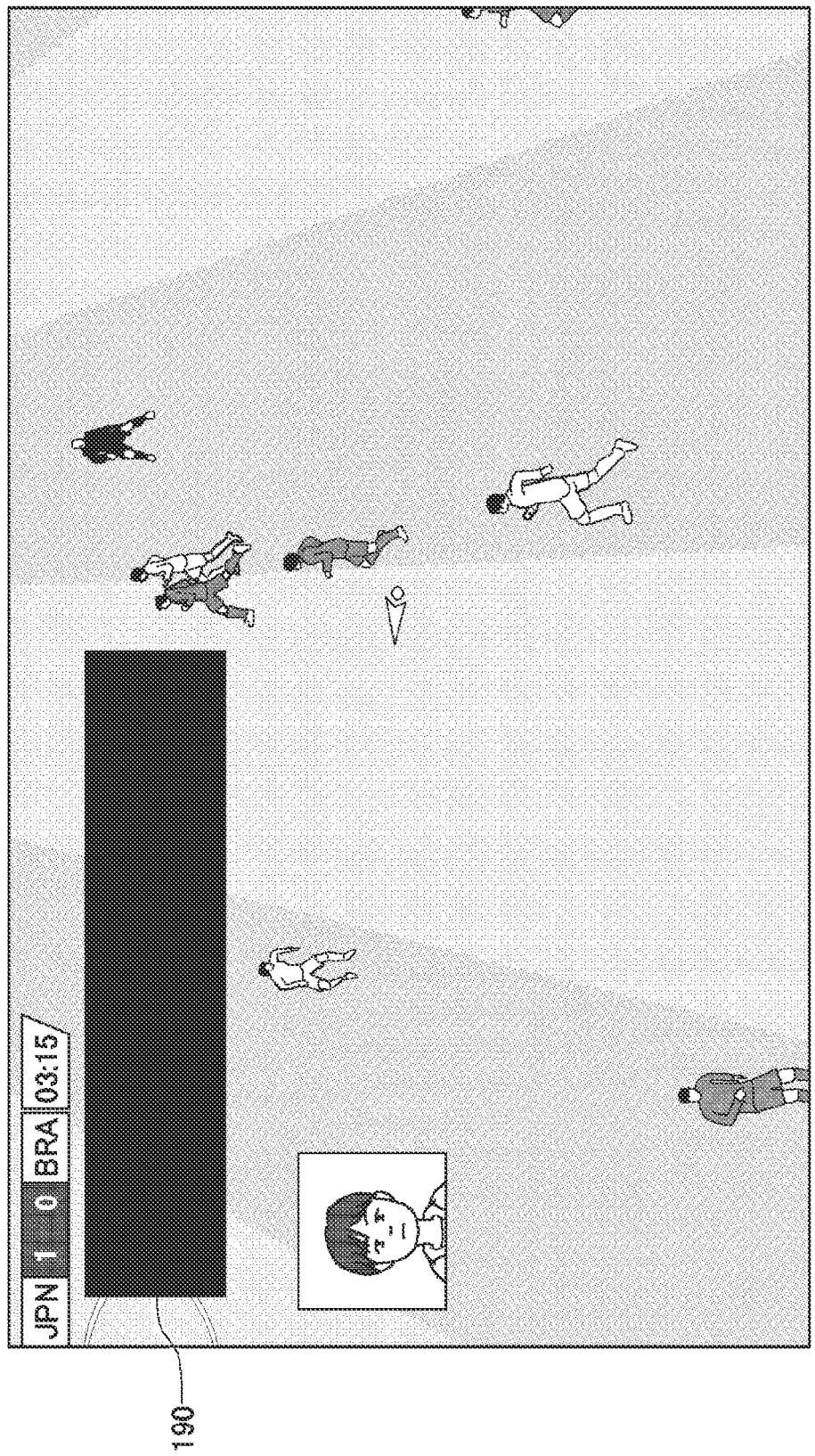
FIG. 13 is a diagram depicting an example of a screen to be displayed on an output apparatus.

FIG. 13 depicts an example of a screen that is displayed on the output apparatuses of the user A and the viewing users during the streaming distribution. The image processing unit 130 merges the game image read out from the game buffer 142 and the system image read out from the system buffer 144. At this time, the image processing unit 130 puts the notification message in the system image into such a state in which the notification message is not visually recognized. In this example, the image processing unit 130 masks a region 190 in which the notification message is arranged with a black image, causing the notification message to be put into an unreadable state. Note that the image processing unit 130 may cause the notification message to be visually unrecognizable in other methods. For example, such image processing as mosaicing may be carried out on the notification message. Accordingly, the personal information contained in the notification message can be prevented from being distributed along with the game image.

As described above, in the information processing apparatus 10, when a camera image is set to be included in a distribution image, the image processing unit 130 generates a distribution image including a region 190 in which the notification message is superimposed and puts the notification message into such a state in which the notification message is not visually recognized. As illustrated in FIG. 13, however, the region 190 covered in black disturbs the progress of the game and should not be included in the distribution image if possible.

In view of this, in the information processing apparatus 10, when a camera image is set not to be included in a distribution image, the image processing unit 130 generates a distribution image not including the region 190 in which the notification message is superimposed. On the setting screen illustrated in FIG. 8, the user A cancels the selection of the check box "INCLUDE CAMERA VIDEO IMAGE IN BROADCAST," and the setting unit 120 sets that the camera image is not included in the distribution image, as a distribution mode in broadcast.

The image processing unit 130 refers to the setting information regarding the streaming distribution and the merge control information to decide an image to be merged. In this example, the setting is made not to include the camera image in the distribution image, and thus, the image processing unit 130 generates a display image which includes a game image read out from the game buffer 142 and does not include the system image. In other words, in a case in which the setting is made not to include the camera image in the distribution image, the image processing unit 130 does not merge the game image and the system image. Hence, even when the message generation unit 116 generates a notification message and the system image generation unit 122 generates a system image including the notification image, the image processing unit 130 does not include the system image in the distribution image, and as a result, the distribution image does not have the region 190 in which the notification message is superimposed included therein.

Figure 14:
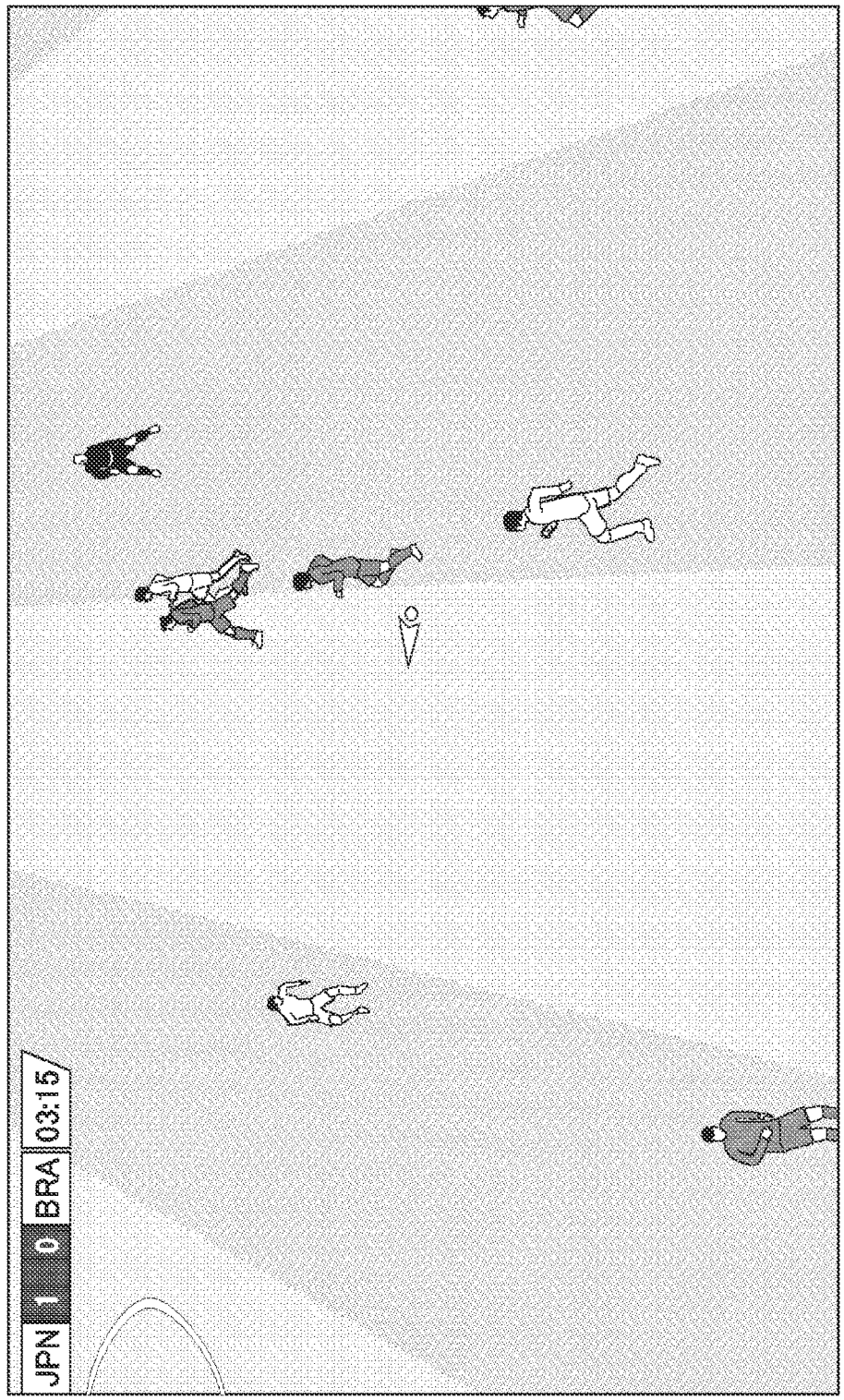
FIG. 14 is a diagram depicting an example of a screen to be displayed on an output apparatus.

FIG. 14 illustrates an example of a screen to be displayed on each output apparatus of the user A and the viewing users. In a case in which the camera image is not included in the distribution image, the image processing unit 130 does not merge the system image into the game image, so that the region 190 masked in black is not displayed on the display screen and the viewing users can view the game image to be distributed with no stress.

In the foregoing description, the present invention has been described on the basis of the embodiment. This embodiment is merely illustrative, and it is understood for those skilled in the art that combinations of constituting elements and processes of the embodiment can be modified in various ways and that such modifications are also within the scope of the present invention.

In the embodiment described above, in the frame buffer unit 140, the game buffer 142 includes a plurality of frame buffers, and the system buffer 144 includes one frame buffer. In the modification example, provided is a description regarding a display image generation process in a case in which the system buffer 144 includes a plurality of frame buffers.

Figures 15, 16:
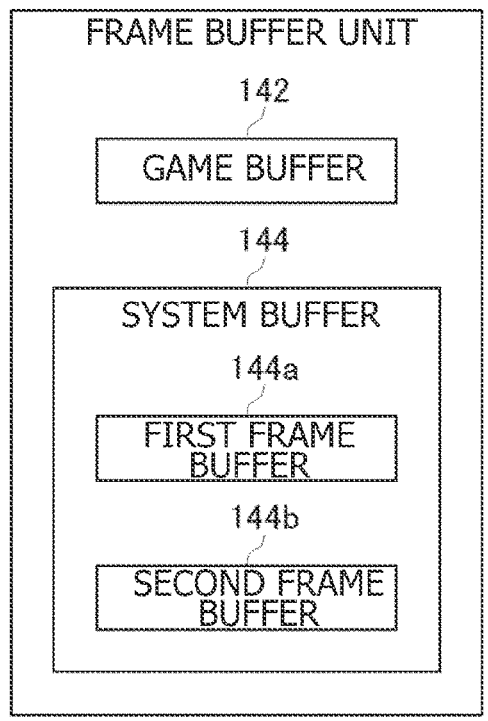
FIG. 15 is a diagram depicting a configuration of a frame buffer unit in a modification example.
FIG. 16 is a diagram depicting an example of merge control information in the modification example.

FIG. 15 indicates a configuration of the frame buffer unit 140 in the modification example. The game buffer 142 stores the game image generated by the game image generation unit 112, and the system buffer 144 stores the system image generated by the system image generation unit 122. The system buffer 144 has a plurality of frame buffers and in this modification example, has two frame buffers, which are a first frame buffer 144a and a second frame buffer 144b.

In the modification example, the system image generation unit 122 generates two types of system images: a first system image and a second system image different from the first system image, in this case. The system image generation unit 122 stores the generated first system image in the first frame buffer 144a, while storing the generated second system image in the second frame buffer 144b. In the modification example, the system image generation unit 122 generates the first system image including a camera image, and a second system image not including a camera image. When the message generation unit 116 generates a notification message, the system image generation unit 122 generates the second system image including the notification message. Thus, in the modification example, the system image generation unit 122 does not include the camera image and the notification message in the same system image.

FIG. 16 indicates merge control information in the modification example. The merge control information is information for controlling merging of images stored in the frame buffer unit 140 and is retained in the flash memory 36 or a storing unit such as the auxiliary storage apparatus 2. The image control information indicated in FIG. 16 determines the followings:

In a case in which the camera image is included in the distribution image, the distribution image is generated by merging the game image and the first system image.

In a case in which the camera image is not included in the distribution image, the distribution image is generated by including the game image only and does not include the first system image and the second system image.

Before starting the streaming distribution, the setting unit 120 provides the setting information regarding the streaming distribution to the image processing unit 130. During the streaming distribution, the image processing unit 130 generates a display image according to contents of the item (a) included in the setting information and the merge control information. Hence, in the modification example, when the camera image is set to be included in the distribution image, the image processing unit 130 generates the distribution image by merging the game image and the first system image. Conversely, when the camera image is set not to be included in the distribution image, the image processing unit 130 generates the distribution image including the game image and not including the first system image and the second system image.

In the modification example, the system buffer 144 has the plurality of frame buffers, so that the system image generation unit 122 can generate the first system image including the camera image and the second system image including the notification message. During the streaming distribution, the image processing unit 130 does not merge the second system image into the game image, making it possible not to include the notification message in the distribution image.

Note that, during distribution of the game, the user A may not be able to play the game for a short period of time for various reasons. The user A may be able to operate a predetermined button (for example, a home button) of the input apparatus 6, allowing the distribution of the camera to be temporarily suspended. In this case, the image processing unit 130 may generate an image indicating "now being temporarily suspended" and provide this image to the image acquiring unit 152. Alternatively, the image processing unit 130 may provide the game image that does not have the system image merged therein, to the image acquiring unit 152.

INDUSTRIAL APPLICABILITY

The present invention can be applicable to the technical field regarding distribution of the game image.

REFERENCE SIGNS LIST

1: Image sharing system
4: Output apparatus
10: Information processing apparatus
11: Shared server
12b, 12c, 12d: Information processing terminal
14b, 14c, 14d: Output apparatus
100: Processing unit
102: Communication unit
104: Accepting unit
110: Execution unit
112: Game image generation unit
114: Game sound generation unit
116: Message generation unit
118: Camera image supplying unit
120: Setting unit
122: System image generation unit
130: Image processing unit
132: Sound providing unit
140: Frame buffer unit
142: Game buffer
144: System buffer
144a First frame buffer
144b: Second frame buffer
150: Sharing processing unit
152: Image acquiring unit
154: Sound acquiring unit
156: Distribution processing unit
158: Setting image generation unit

The invention claimed is:

1. An information processing apparatus comprising:
a game image generation unit configured to generate a game image;
a message generation unit configured to generate a notification message;
a setting unit configured to register setting information determining whether or not a camera image is to be included in a distribution image;
an image processing unit configured to generate a distribution image including the game image;
a distribution processing unit configured to distribute the distribution image; and
a system image generation unit configured to generate a system image including the notification message, wherein:
when the camera image is set to be included in the distribution image, the image processing unit generates the distribution image including a region in which the notification message is superimposed,
when the camera image is set not to be included in the distribution image, the image processing unit generates the distribution image not including the region in which the notification message is superimposed,
when the camera image is set to be included in the distribution image, the system image generation unit generates the system image including the camera image,
when the camera image is set to be included in the distribution image, the image processing unit merges the game image and the system image to generate the distribution image, and
when the camera image is set not to be included in the distribution image, the image processing unit generates the distribution image including the game image and not including the system image.

2. The information processing apparatus according to claim 1, further comprising:
a game frame buffer configured to store the game image generated by the game image generation unit; and
a system frame buffer configured to store the system image generated by the system image generation unit,
wherein the image processing unit has a function of merging the game image stored in the game frame buffer and the system image stored in the system frame buffer.

3. An information processing apparatus comprising:
a game image generation unit configured to generate a game image;
a game frame buffer configured to store the game image generated by the game image generation unit;
a system image generation unit configured to generate a system image;
a system frame buffer configured to store the system image generated by the system image generation unit; and
an image processing unit having a function of merging the game image stored in the game frame buffer and the system image stored in the system frame buffer,
wherein the system image generation unit generates a first system image and a second system image different from the first system image, and
the system frame buffer includes a first frame buffer that stores the first system image and a second frame buffer that stores the second system image.

4. The information processing apparatus according to claim 3, wherein the system image generation unit generates the first system image including a camera image, and the second system image not including a camera image.

5. The information processing apparatus according to claim 3, further comprising:
an image processing unit configured to generate a distribution image including the game image;
a distribution processing unit configured to distribute the distribution image; and
a setting unit configured to register setting information determining whether or not a camera image is to be included in the distribution image,
wherein, when the camera image is set to be included in the distribution image, the image processing unit merges the game image and the first system image to generate the distribution image, and
when the camera image is set not to be included in the distribution image, the image processing unit generates the distribution image including the game image and not including the first system image and the second system image.

6. A game image distribution method comprising:
generating a game image;
generating a notification message;
setting whether or not a camera image is to be included in a distribution image;
generating a distribution image including the game image;
distributing the distribution image; and
generating a system image including the notification message, wherein:
when the camera image is set to be included in the distribution image, the distribution image generating step generates the distribution image including a region in which the notification message is superimposed,
when the camera image is set not to be included in the distribution image, the distribution image generating step generates the distribution image not including the region in which the notification message is superimposed,
when the camera image is set to be included in the distribution image, the generating the system image includes generating the system image including the camera image,
when the camera image is set to be included in the distribution image, the generating the distribution image includes merging the game image and the system image to generate the distribution image, and
when the camera image is set not to be included in the distribution image, the generating the distribution image includes generating the distribution image including the game image and not including the system image.

7. A non-transitory, computer readable storage medium containing a computer program, which when executed by a computer, causes the computer to perform a game image distribution method by carrying out actions, comprising:
generating a game image;
generating a notification message;
setting whether or not a camera image is to be included in a distribution image;
generating a distribution image including the game image;
distributing the distribution image; and
generating a system image including the notification message, wherein:
when the camera image is set to be included in the distribution image, the distribution image generating step generates the distribution image including a region in which the notification message is superimposed,
when the camera image is set not to be included in the distribution image, the distribution image generating step generates the distribution image not including the region in which the notification message is superimposed,
when the camera image is set to be included in the distribution image, the generating the system image includes generating the system image including the camera image,
when the camera image is set to be included in the distribution image, the generating the distribution image includes merging the game image and the system image to generate the distribution image, and
when the camera image is set not to be included in the distribution image, the generating the distribution image includes generating the distribution image including the game image and not including the system image.

* * * * *